United States Patent [19]
Sakow

[11] Patent Number: 5,195,842
[45] Date of Patent: Mar. 23, 1993

[54] OIL SPILL TENT

[76] Inventor: Toshihiko Sakow, 82 Copley Ave., Teaneck, N.J. 07666

[21] Appl. No.: 905,829

[22] Filed: Jun. 29, 1992

Related U.S. Application Data

[63] Continuation of Ser. No. 790,484, Nov. 12, 1991, abandoned, which is a continuation of Ser. No. 644,302, Jan. 22, 1991, abandoned.

[51] Int. Cl.$^5$ .............................................. E02B 15/06
[52] U.S. Cl. ........................................ 405/60; 405/68; 405/72
[58] Field of Search .................. 405/26, 60, 63, 64, 405/66, 68, 72, 210; 210/923

[56] References Cited

U.S. PATENT DOCUMENTS

| | | |
|---|---|---|
| 3,200,598 | 8/1965 | Krepak ................................ 405/26 |
| 3,879,951 | 8/1975 | Mason ................................. 405/60 |
| 4,290,714 | 9/1981 | Strange ............................... 405/60 |
| 4,373,834 | 2/1983 | Grace .................................. 405/60 |
| 4,531,860 | 7/1985 | Barnett ............................... 405/60 |

*Primary Examiner*—David H. Corbin
*Attorney, Agent, or Firm*—Howard C. Miskin

[57] ABSTRACT

An apparatus for containing and cleaning up an oil spill at an offshore oil platform in a body of water includes a hollow circular ring surrounding the oil rig and supporting a depending frustoconical skirt wall anchored to the ground by biasing springs which permits the vertical movement of the ring and skirt wall with variations in the water level. A second hollow ring is connected to the first ring by a peripheral skirt wall which confines oil floating on the water surface. A tanker along the side of the rings sucks up the ring-confined oil by suction pumps and stores and removes the oil. In an alternative form, the first skirt wall is formed of an elastomeric web and stays extending obliquely along the wall face between ground and the first ring biases the wall and ring downwardly.

12 Claims, 3 Drawing Sheets

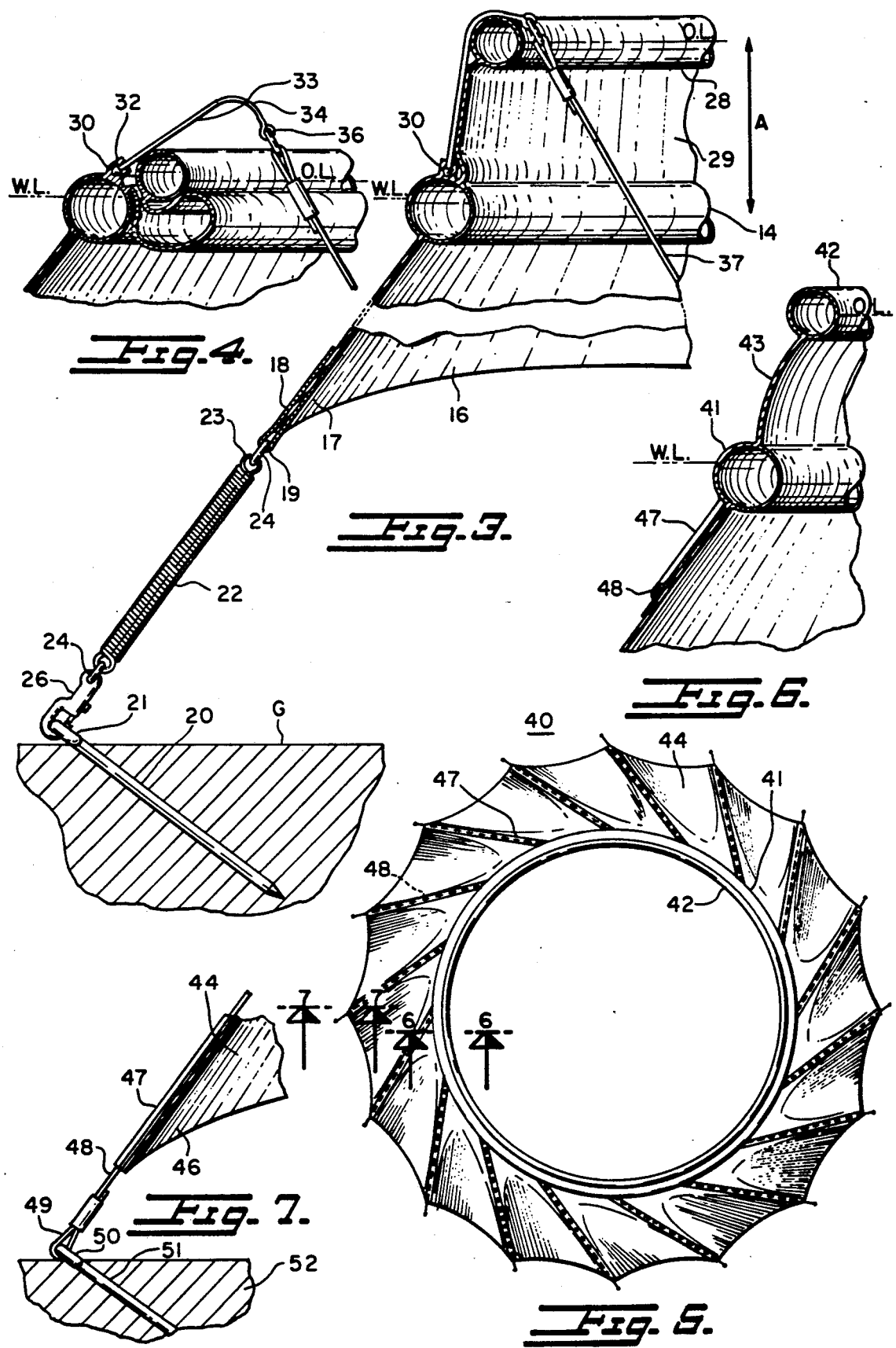

OIL SPILL TENT

This is a continuation of application Ser. No. 07/790,484, filed Nov. 12, 1991 now abandoned, which is a continuation of Ser. No. 07/644,302 filed Jan. 22, 1991, now abandoned.

BACKGROUND OF THE INVENTION

Offshore oil rigs or platforms are widely employed in the drilling for and recovery of oil occurring in the ground beneath bodies of water. Even with the exercise of great care, the potential for leakage or discharge of oil into the water is high with the danger of extensive ecological damage. Once the oil escapes into the water and rises to the surface, it generally forms oil slicks which are driven by both winds and water currents over large areas and eventually reach land. The containment of such slicks and the recovery of the floating oil are, at best, very difficult, inefficient and expensive and a major part of the oil is usually not recovered and generally adversely affects the environment. Moreover, the equipment heretofore employed in treating and handling oil spills in bodies of water is bulky, difficult to deploy and highly time consuming to transport and operate. Accordingly, oil spills occurring in bodies of water are seldom adequately contained before they are out of hand and headed for ecologically sensitive areas.

BRIEF DESCRIPTION OF THE INVENTION

It is a principal object of the present invention to provide an improved anti-pollution apparatus.

Another object to the present invention is to provide an improved apparatus for holding oil spills in bodies of water.

Still another object of the present invention is to provide an improved apparatus for containing and removing oil escaping into a body of water in the area of an offshore oil rig or platform.

A further object of the present invention is to provide an apparatus of the above nature which is highly reliable and efficient, may be activated in a minimum of time and is of great versatility and adaptability.

The above and other objects of the present invention will become apparent from a reading of the following description taken in conjunction with the accompanying drawings which illustrate preferred embodiments thereof.

An apparatus in accordance with the present invention includes a first buoyant ring afloat on the surface of a body of water in the area of a potential oil spill and anchored in position and downwardly biased to permit the rise and fall of the first ring with the rise and fall of the water surface, a first flexible apron wall depending from the first ring, a second buoyant ring approximately coextensive with the first ring, a second flexible apron wall interconnecting and extending along the peripheries of the first and second ring and means for recovering oil floating in the area surrounded by the first ring.

The first apron wall preferably diverges downwardly and is of frustroconical shape, its bottom border being connected by helical extension springs extending between the apron wall bottom border and ground anchored pins.

Alternatively, the first apron wall may be formed of an elastomeric material and is joined to oblique stays ground anchored at their bottoms and connected at their tops to the first ring. Advantageously, peripherally spaced arms are pivoted at their inner ends to the first ring, extend inwardly across the first ring and are connected at their outer ends to the upper ends of inwardly downwardly inclined stays which are connected at their bottom ends to ground anchored tension springs. The rings are preferably formed of a flexible or pliable material to facilitate their storage and shipping and are advantageously inflatable and deflatable.

The improved apparatus is capable of containing high volumes of oil while facilitating its easy and efficient removal, recovery and storage. The apparatus is simple and convenient to use, highly efficient and of great versatility and adaptability.

BRIEF DESCRIPTION OF THE DRAWINGS

FIG. 3 is a fragmentary sectional view taken along line 3—3 in FIG. 2, showing the apparatus in an oil-containing condition;

FIG. 4 is a fragmented view of FIG. 3 showing the apparatus in the absence of contained oil;

FIG. 5 is a top plan view of another embodiment of the present invention;

FIG. 6 is an enlarged sectional view taken along line 6—6 in FIG. 5; and

FIG. 7 is an enlarged sectional view taken along line 7—7 in FIG. 5.

DESCRIPTION OF THE PREFERRED EMBODIMENTS

Figure 1:
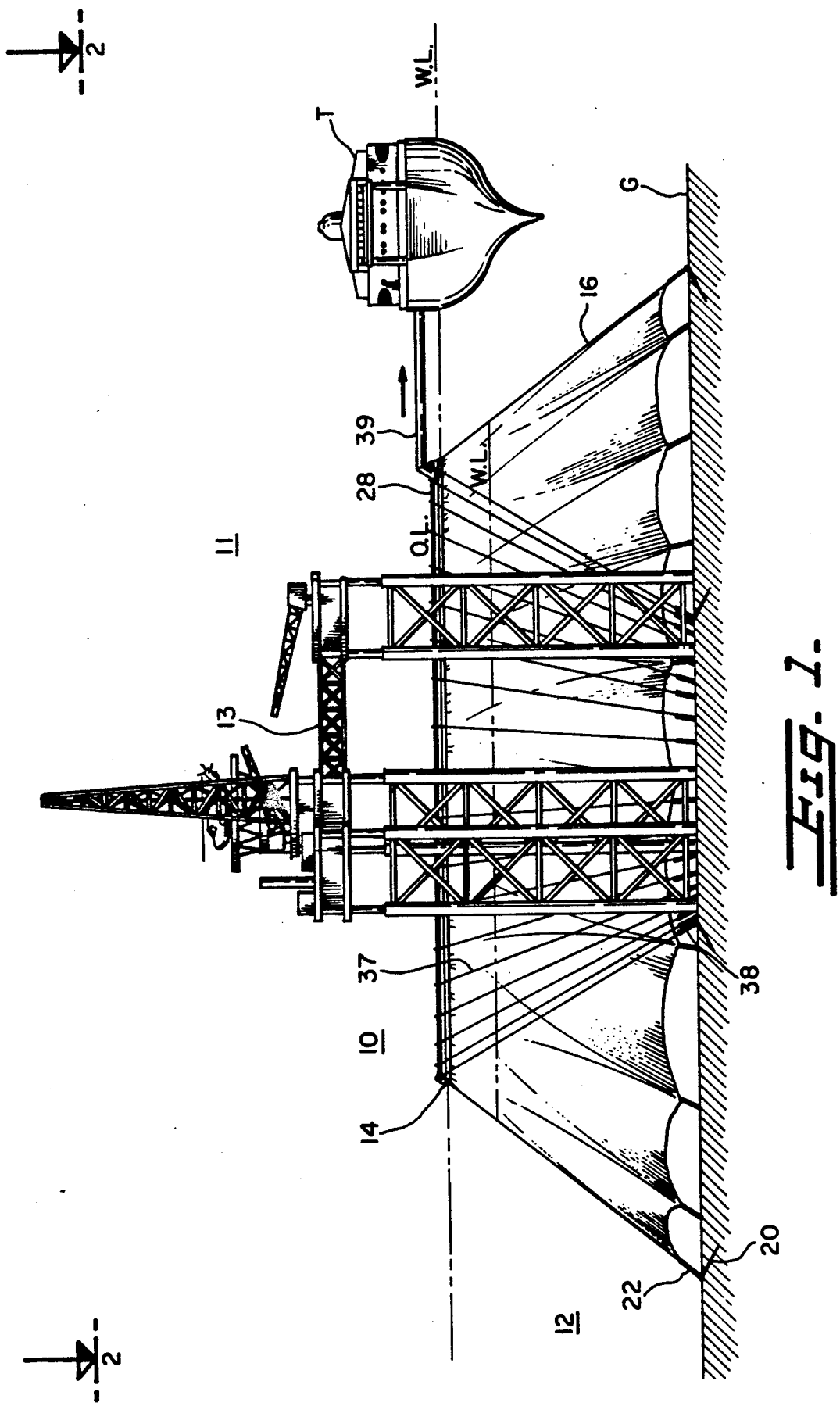
FIG. 1 is an elevational view of a preferred embodiment of the present invention shown in operational position.
Figure 2:
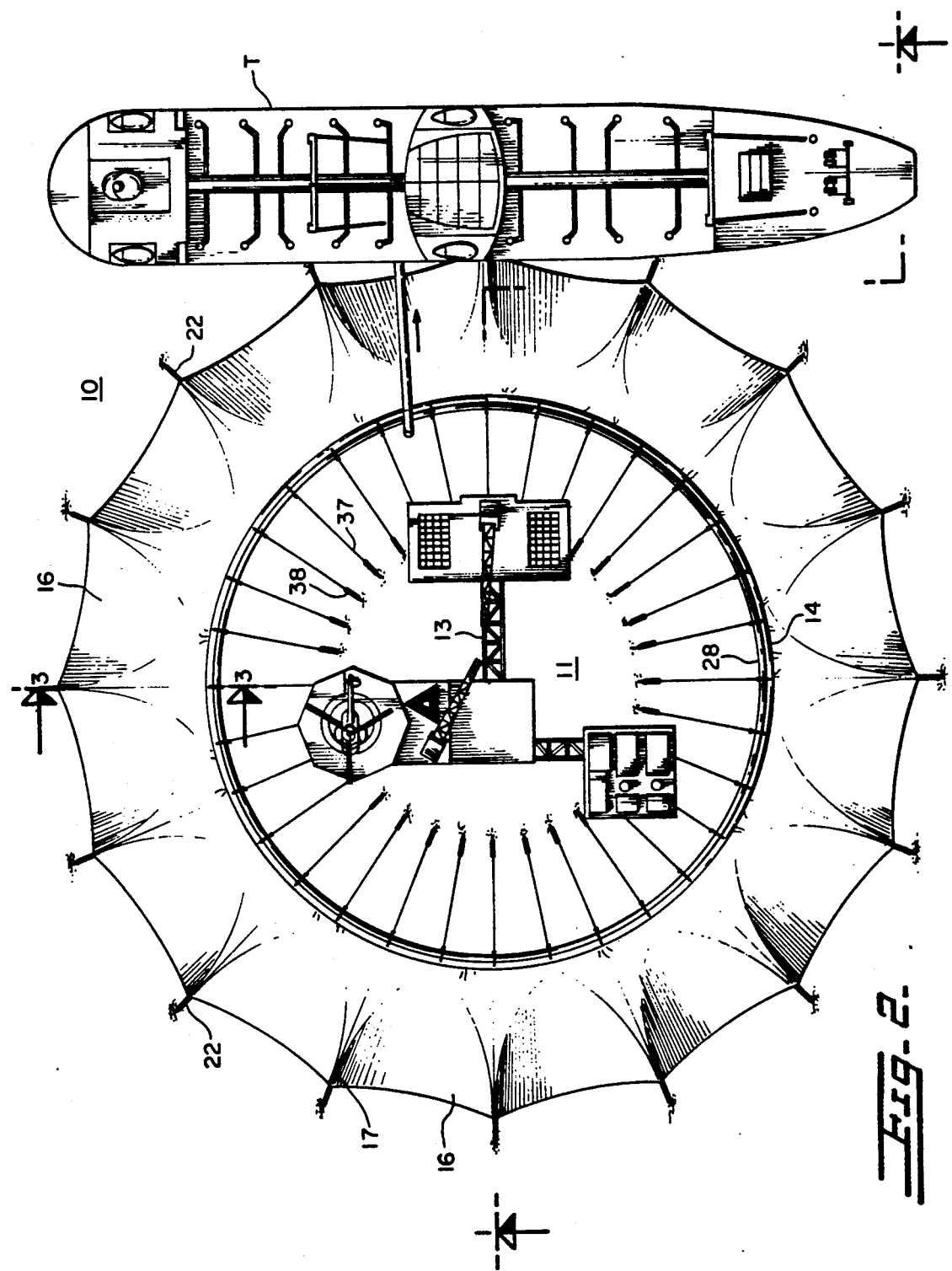
FIG. 2 is a top plan view thereof taken along line 2—2 in FIG. 1.

Referring now to the drawings, particularly FIGS. 1 to 4 thereof which illustrate a preferred embodiment of the present invention, the reference numeral 10 generally designates the improved apparatus which is shown associated with an offshore oil installation 11 located in a body of water 12 having a water level W.L. which rises and falls with the tide and other ambient influences. The installation 11 may be an oil drilling and recovery rig or platform of conventional and known construction and includes a platform 13 mounted above the water level W.L. atop vertical column frame structures resting by means of footing or other ground embedded base members on the ground G of the water body 12. The various oil drilling, pumping and material handling equipment as well as housings and shelters are located on platform 13. The installation 13 is located in the area of available or potential oil and from which oil may possibly escape into the surrounding body of water and constitute an oil spill.

The containment apparatus includes a buoyant first ring 14 afloat on the surface of the water body 12 and surrounding and radially spaced from the installation 10 so as not to interfere with the operation of installation 10 while providing sufficient area for capturing and containing any oil escaping in the vicinity. While ring 10 is shown as being of toroidal configuration, it may be of any suitable or desirable configuration. Ring 14 is formed of a corrosion and water resistant material and is hollow and flexible and preferably inflatable and deflatable in any suitable manner. Moreover, ring 14 may be formed of a foamed plastic material and in segments.

An apron wall 16 formed of a pliable or flexible waterproof material, for example, a rubberized fabric of natural or synthetic fibers, is downwardly outwardly diverging and of frustroconical shape and is secured along its upper edge to the bottom face of ring 14 and is peripherally coextensive with ring 14. The bottom border of apron wall 16 is scalloped to form peripherally spaced apices 17 and a strap 18 terminating at its bottom in a loop or eye 19 is secured to the apron wall bottom border at each of the apices 17.

An anchoring pin 20 terminating in an upper eye 21 is driven at an angle into ground G radially outwardly of and below stray loop 19. Helical tension springs 27 having top hooks 23 engage respective strap loops 19 by means of coupling rings. The bottoms of springs 22 terminate in bottom loops which are ring connected to respective coupling buckles 26 which detachably engage anchoring pin eyes 21. The springs 22 function to downwardly bias the lower border of apron wall 16 and first ring 14 to permit them to rise and fall with the water level while radially extending the bottom border of wall 14.

A second hollow buoyant ring 28 of slightly lesser diameter and smaller transverse cross section than first ring 14 is coaxial and coextensive with first ring 14. Connecting first and second rings 14 and 28 is a pliable or flexible liquid impervious relatively narrow second apron wall 29 which is peripherally coextensive with rings 14 and 18. Ring 28 may rise and fall relative to first ring 14 to raise and lower apron wall 29 and hence contain oil within the space delineated by second apron wall 29 as second ring 28 is raised by oil accumulating in such space.

A plurality of pivot socket members 30 are integrally formed with and project upwardly from first ring 14. Swingably engaging each socket member 30 is the enlarged end head 32 of an arm 33 which bears on the top face of second ring 28. Arm 33 terminates at its free end in an inwardly curved leg 34 provided at its end with an eye 36.

Each arm 33 is urged or biased downwardly and radially inwardly by an inwardly downwardly inclined stay 37 whose upper end is looped and coupled by a ring to a respective eye 36. The lower end of each stay 37 is anchored to ground G through a respective helical tension spring 38 and an anchoring pin in the manner of apron wall apex straps 18.

An oil tanker T, when required or desired, is anchored outside rings 14 and 28 in a position not interfering with first apron 16. Oil accumulating in the oil containment space delineated by rings 14 and 28 and second apron wall 29 is withdrawn by high capacity pumps in tanker T by way of piping or conduit 39 extending between the oil containment space and the suction parts of the tanker carried pumps, the withdrawn oil being stored in the ship oil storage areas.

In the operation of the improved apparatus 10, it is installed to encircle the offshore oil installation at a sufficient distance to permit easy conduit access to the escaped oil containment area surrounded by ring 14 and 18 and second apron wall 29. Any oil escaping from the installation 11 and from the underlying ground floats upwardly as restricted by first apron wall 16 into the oil containment space and, as the oil level in this space rises, the second ring 28 likewise rises, floating atop the contained oil and raise second apron wall 29, as shown in FIG. 3, to contain the escaping oil and permit its removal by the ship-carried pumps. Variations in the offshore water level and in the contained oil level correspondingly adjusts the levels of rings 14 and 18 which are downwardly biased.

In FIGS. 5 to 7 of the drawings, there is illustrated another embodiment of the present invention which differs from that first described primarily in the construction of the first apron wall which additionally functions to downwardly bias the first buoyant ring. Specifically, the modified structure 40 includes a first buoyant ring 41, a second buoyant ring 42 and a second apron wall 43 interconnecting the rings 41 and 42, rings 41 and 42 and apron wall 43 being similar to the corresponding rings and wall of the first embodiment.

Secured to and depending from first ring 41 is the downwardly diverging first apron wall 44 whose upper border is coextensive with first ring 14 and whose bottom edge is scalloped to provide peripherally spaced apices 46. The apron wall ring 4 is formed of a liquid impervious elastomeric material and has formed on its outer face tubular housings 47 which extend obliquely from each of the apices 46 to the first ring 41. A flexible stay 48 extends through each housing 42 and is pivotally connected at its upper end to first ring 41 and terminates at its lower end in a loop 49 which is shortly below the corresponding apex 46. Each loop 49 engages the upper eye 50 of an anchoring pin driven obliquely in the ground 52 to anchor the bottom of first apron wall 44.

The construction of apron wall 44 and the associated stays 48 function to downwardly bias first ring 41 since a rise in ring 41 consequent to a rise in the water level, raises the upper border of apron wall 44 and the top of oblique stays 48 to effect a twisting of the upper part of apron wall 44 imparting a peripheral elastic stretch thereto which is resisted by the apron wall and provides a reaction opposite twisting fore to urge ring 41 downwardly. In use, the apparatus 40 last described, except for the manner of achieving the downward bias on the first buoyant ring, operates in the manner of the first described apparatus.

While there have been described and illustrated preferred embodiments of the present invention, it is apparent that numerous alterations, additions and omissions may be made without departing from the spirit thereof.

I claim:

1. An apparatus for handling an oil spill in a body of water having an upper surface comprising:
   a first buoyant ring;
   means for anchoring said first ring in a position afloat on said upper surface of said body of water overlying the area of a potential oil escape;
   a first flexible apron wall depending from and extending peripherally along said first ring;
   a second buoyant ring substantially coextensive with said first ring; and
   a second flexible apron wall extending between and secured to said first and second rings, said second ring being upwardly movable relative said first ring and said water surface to extend said second apron wall above said water surface to delineate an oil containing space.

2. The apparatus of claim 1 wherein said anchoring means resiliently downwardly biases said first ring to permit said first ring to rise and fall with the level of the surface of said water.

3. The apparatus of claim 1 wherein said anchoring means downwardly biases the bottom of said first apron wall.

4. The apparatus of claim 1 wherein said first apron wall diverges downwardly.

5. The apparatus of claim 4 wherein said apron wall is of frustroconical configuration.

6. The apparatus of claim 1 wherein said first apron wall includes a bottom border and said anchoring means includes anchoring members anchored to the underlying ground and elongatable tension members connecting said bottom border of said first apron wall to said tension members.

7. The apparatus of claim 1 including a plurality of peripherally spaced arms having opposite inner and free ends and being swingably connected at said inner ends to said first ring and extending over said second ring and stays extending inwardly and downwardly from said free ends of said arms and having anchored lower ends.

8. The apparatus of claim 7 wherein said stay lower ends are anchored through rings biasing said stays downwardly.

9. The apparatus of claim 1 wherein said rings are circular and said second ring is of lesser buoyancy than said first ring.

10. The apparatus of claim 1 including means for pumping liquid out of said oil containing space.

11. The apparatus of claim 1 wherein said first apron wall is of frustroconical configuration diverging downwardly and is formed of an elastomeric material and said anchoring means comprises stays extending obliquely downwardly from said first ring along a face of said first apron wall and being secured thereto and having lower ends anchored whereby to resiliently bias said first ring against the raising thereof.

12. The apparatus of claim 5 wherein said first apron wall has a bottom border, and including a plurality of coupling straps secured to and depending from said bottom border of said first apron wall and said anchoring means includes a plurality of peripherally space ground anchored members and tension springs extending between said ground anchored member and respective of said straps.

* * * * *